(12) United States Patent
Liu et al.

(10) Patent No.: US 8,890,880 B2
(45) Date of Patent: Nov. 18, 2014

(54) GRAPHICS PIPELINE SCHEDULING ARCHITECTURE UTILIZING PERFORMANCE COUNTERS

(75) Inventors: Wanggen Wayne Liu, Shanghai (CN); Jia Chen, Shanghai (CN); Jun Jason Ye, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 13/515,989

(22) PCT Filed: Dec. 16, 2009

(86) PCT No.: PCT/CN2009/001462
§ 371 (c)(1),
(2), (4) Date: Jun. 14, 2012

(87) PCT Pub. No.: WO2011/072419
PCT Pub. Date: Jun. 23, 2011

(65) Prior Publication Data
US 2012/0249564 A1    Oct. 4, 2012

(51) Int. Cl.
*G06T 1/00* (2006.01)
*G06T 15/00* (2011.01)
*G06F 9/50* (2006.01)
*G06T 1/20* (2006.01)

(52) U.S. Cl.
CPC ................ *G06T 1/20* (2013.01); *G06F 9/5016* (2013.01); *G06F 9/5083* (2013.01); *Y02B 60/142* (2013.01)
USPC ....................................................... 345/522

(58) Field of Classification Search
CPC ............... G06T 1/60; G06T 1/20; G06T 1/00; G06F 9/50
USPC .......................................... 345/522, 501, 530
See application file for complete search history.

(56) References Cited

U.S. PATENT DOCUMENTS

| 7,475,197 | B1 | 1/2009 | Bouge et al. |
| 7,574,708 | B2 | 8/2009 | Chung et al. |
| 2004/0125111 | A1 | 7/2004 | Tang-Petersen et al. |
| 2006/0168571 | A1 | 7/2006 | Ghiasi et al. |
| 2007/0252843 | A1 | 11/2007 | Yu et al. |
| 2008/0235364 | A1* | 9/2008 | Gorbatov et al. ............. 709/224 |
| 2009/0235274 | A1 | 9/2009 | Uruma et al. |
| 2013/0086425 | A1* | 4/2013 | Choi et al. ....................... 714/32 |
| 2013/0308457 | A1* | 11/2013 | Luo et al. ...................... 370/235 |

FOREIGN PATENT DOCUMENTS

| CN | 1664803 A | 9/2005 |
| JP | 2002259143 A | 9/2002 |

OTHER PUBLICATIONS

International Search Report, PCT/CN2009/001462, Search Report mailed Jun. 17, 2010, English.

* cited by examiner

*Primary Examiner* — David Zarka
*Assistant Examiner* — Brian Kravitz
(74) *Attorney, Agent, or Firm* — International IP Law Group, P.C.

(57) ABSTRACT

A method, device, and system are disclosed. In one embodiment the method includes determining a current computing-memory ratio. Then the method compares the current computing-memory ratio to a lower ratio threshold value. Then the method configures a next draw command to be performed using a graphics memory efficiency operational mode when the current computing-memory ratio is below the lower ratio threshold value.

25 Claims, 7 Drawing Sheets

GRAPHICS PIPELINE SCHEDULING ARCHITECTURE UTILIZING PERFORMANCE COUNTERS

CROSS REFERENECE TO RELATED APPLICATIONS

Pursuant to 35 U.S.C. §371, this application is the United States National Stage Application of International Patent Application No. PCT/CN2009/001462, filed on Dec. 16, 2009, the contents of which are incorporated by reference as if set forth in their entirety herein.

FIELD OF THE INVENTION

This invention relates to scheduling commands in a graphics pipeline with the help of performance counters.

BACKGROUND OF THE INVENTION

Current discrete graphics cards generally include several processing cores to calculate vertex, geometry, and pixel data. Generally several cores are grouped as a multi-core (m-core) and each m-core is usually paired with a texture unit. The texture units are coupled to one or more memory controllers that provide an interface to the video memory on the card. Many of these components of a discrete graphics card may be present in integrated graphics solutions as well. Integrated graphics solutions may be integrated with a chipset or with a central processing unit. Graphics cards may partition image data, including pixels, vertices, and geometry data) into fixed sized blocks. These blocks of image data are then distributed among the several graphics processing m-cores and texture units. Furthermore, many processing m-cores, texture units, and memory controllers include several performance counters to allow performance calculations to be made to determine the efficiency of these devices.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, device, and system implementing a bottleneck-sensitive graphics pipeline scheduling architecture are described.

Logic to aid in scheduling a graphics pipeline resides in a computer system. The logic collects data received from hardware performance counters and calculates whether graphics memory or graphics m-core computations may be causing a bottleneck in the performance of the graphics subsystem of the computer system. Once the calculations have been made and the bottleneck has been determined, the logic is capable of making changes to the scheduling process of the current and future draw commands being received from a graphics driver. Scheduling a draw command comprises assigning graphics m-cores and texture units to certain blocks of image data (including texture data, vertex data, and geometry data) throughout an image to be displayed. This image data is partitioned into blocks of certain pixel sizes (e.g. 8×8 pixels, 32×32 pixels, etc.). Changing the block size can change the efficiency of the m-cores and the video memory. Thus, once the bottleneck has been identified, the graphics m-cores and texture units are scheduled to operate on larger or smaller blocks of data accordingly.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. In the following description and claims, the terms "include" and "comprise," along with their derivatives, may be used, and are intended to be treated as synonyms for each other.

Figure 1:
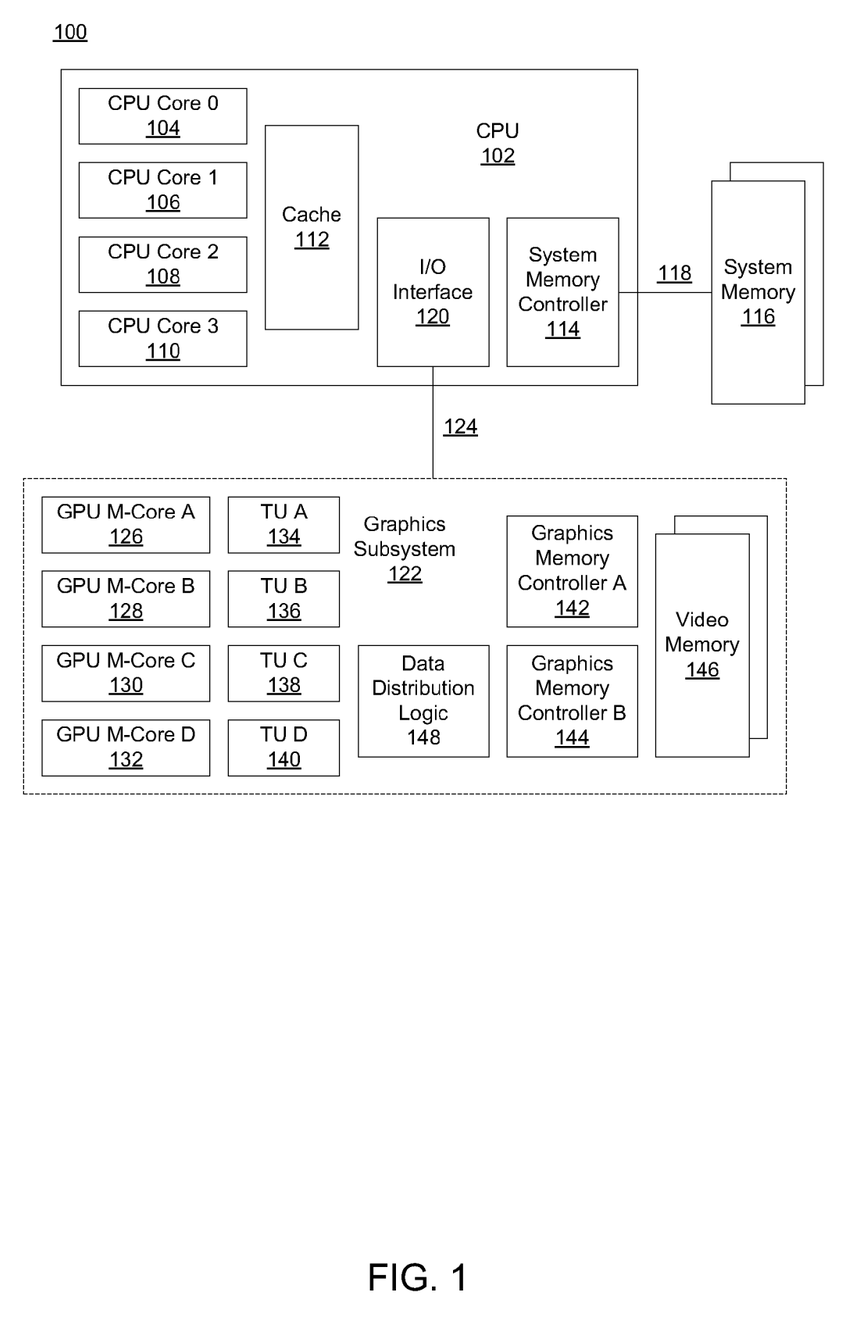
FIG. 1 illustrates an embodiment of a general purpose computer system implementing a bottleneck-sensitive graphics pipeline scheduling architecture.

FIG. 1 illustrates an embodiment of a general purpose computer system implementing a bottleneck-sensitive graphics pipeline scheduling architecture.

Computer system 100 is shown. The computer system may be a desktop, server, workstation, laptop, handheld device, television set-top, media center, game console, integrated system (such as in a car), or other type of computer system. In several embodiments the computer system 100 includes a central processing unit (CPU) 102. The CPU 102 may be an Intel® Corporation CPU or a CPU of another brand. The CPU may include more than one core. In fact the CPU 102 may contain N cores of which core 0 (104), core 1 (106), core 2 (108), and core 3 (110) are shown. Potentially, N may be any positive number. In many embodiments, each core (such as core 0 (104)) includes internal functional blocks such as one or more execution units, retirement units, a set of general purpose and specific registers, etc. If cores such as core 0 (104), core 1 (106), etc. are multi-threaded or hyper-threaded, then each hardware thread is considered as a core for the purposes of this invention.

CPU 102 may also include a cache 112 to store data for use by one or more of the cores. In different embodiments the cache may be apportioned in different ways. Cache 112 may be one of many different sizes in separate embodiments. For example, cache 112 may be an 8 megabyte (MB) cache, a 16 MB cache, etc. Additionally, in different embodiments the cache may be a direct mapped cache, a fully associative cache, or a multi-way set-associative cache. The cache may include one large portion shared among all cores or may be divided into several separately functional slices (e.g., one slice for each core). The cache may also include one large portion shared among all cores and one portion that is divided into several separately functional slices.

CPU 102 also may include a system memory controller 114 to provide an interface to communicate with system memory 116 across processor-memory interconnect 118. In other embodiments that are not shown, memory controller 114 may be a discrete device or integrated within another device within computer system 100.

System memory 116 may comprise dynamic random access memory (DRAM), such as a type of double data rate (DDR) DRAM, non-volatile memory such as flash memory, phase change memory (PCM), or another type of memory technology. The system memory 116 may be a general purpose memory to store data and instructions to be operated upon by CPU 102, other CPUs within computer system 100, and potentially other devices within computer system 100 (e.g., a direct memory access (DMA)-capable I/O device).

Processor-memory interconnect 118 may include one or more optical, metal, or other wires (i.e. lines) that are capable of transporting data, address, control, and clock information.

Although not shown, CPU 102 also may include a power and clock functional unit that supplies power to the CPU 102 and provides a reference clock signal for the circuitry residing on CPU 102.

Furthermore, CPU 102 may also include an I/O Interface unit 120. I/O interface unit 120 may enable communication between CPU 102 and any other CPUs. Additionally, I/O interface unit 120 or another communication block that is not shown may also allow communication between CPU 102 and an I/O hub complex that is not shown. An I/O hub complex may include one or more I/O host controllers to provide an interface for communication between one or more I/O devices and the rest of computer system 100.

Additionally, I/O interface unit 120 may provide a communication interface between CPU 102 and a graphics subsystem 122 across processor-graphics interconnect 124. Processor-graphics interconnect may be a peripheral component interface (PCI) Express interconnect that includes one or more high-speed, bi-directional serial interface lanes. In other embodiments, processor-graphics interconnect 124 utilizes another protocol for communication between the CPU 102 and the graphics subsystem 122.

The graphics subsystem 122 may be incorporated within a discrete add-in card that can plug into a communicative slot interface in a motherboard in computer system 100. In other embodiments, the graphics subsystem may be wired directly into a motherboard in computer system 100 with no slot interface to allow interchanging different discrete graphics cards.

The graphics subsystem 122 may include several GPU m-cores to execute draw commands for two and three dimensional image rendering to a display screen. Each m-core may comprise several (e.g., 8, 16, 40, etc.) individual cores in a group. There may be M GPU m-cores where M is a positive integer. For example, in the embodiment shown in FIG. 1, the graphics subsystem 122 includes four m-cores, GPU m-core A (126), GPU m-core B (128), GPU m-core C (130), and GPU m-core D (132).

In many embodiments, one or more texture units (TUs) are matched up with the GPU m-cores, at a 1-to-1 ratio. In FIG. 1, which has four separate graphics m-cores, there are four texture units: TU A (134), TU B (136), TU C (138), and TU D (140). In other embodiments, the GPU m-cores and TUs are not matched up in a 1-to-1 basis, thus it is possible to have embodiments with more GPU m-cores than TUs or more TUs than GPU m-cores.

Graphics subsystem 122 also may include one or more graphics memory controllers, such as graphics memory controller A (142) and graphics memory controller B (144). The graphics memory controllers provide an interface between the m-cores/TUs and the video memory 146. The video memory may be some form of DRAM or other memory technology. Generally, video memory is at least as fast or faster in access times than general system memory due to the large amount of throughput required at extremely fast rates for videos and graphics intensive programs.

In many embodiments, graphics subsystem 122 includes data distribution logic 148. Data distribution logic 148 is capable of providing bottleneck analysis of the graphics pipeline in computer system 100. The graphics pipeline bottleneck analysis will be discussed in detail in FIG. 4-FIG. 7.

Figure 2:
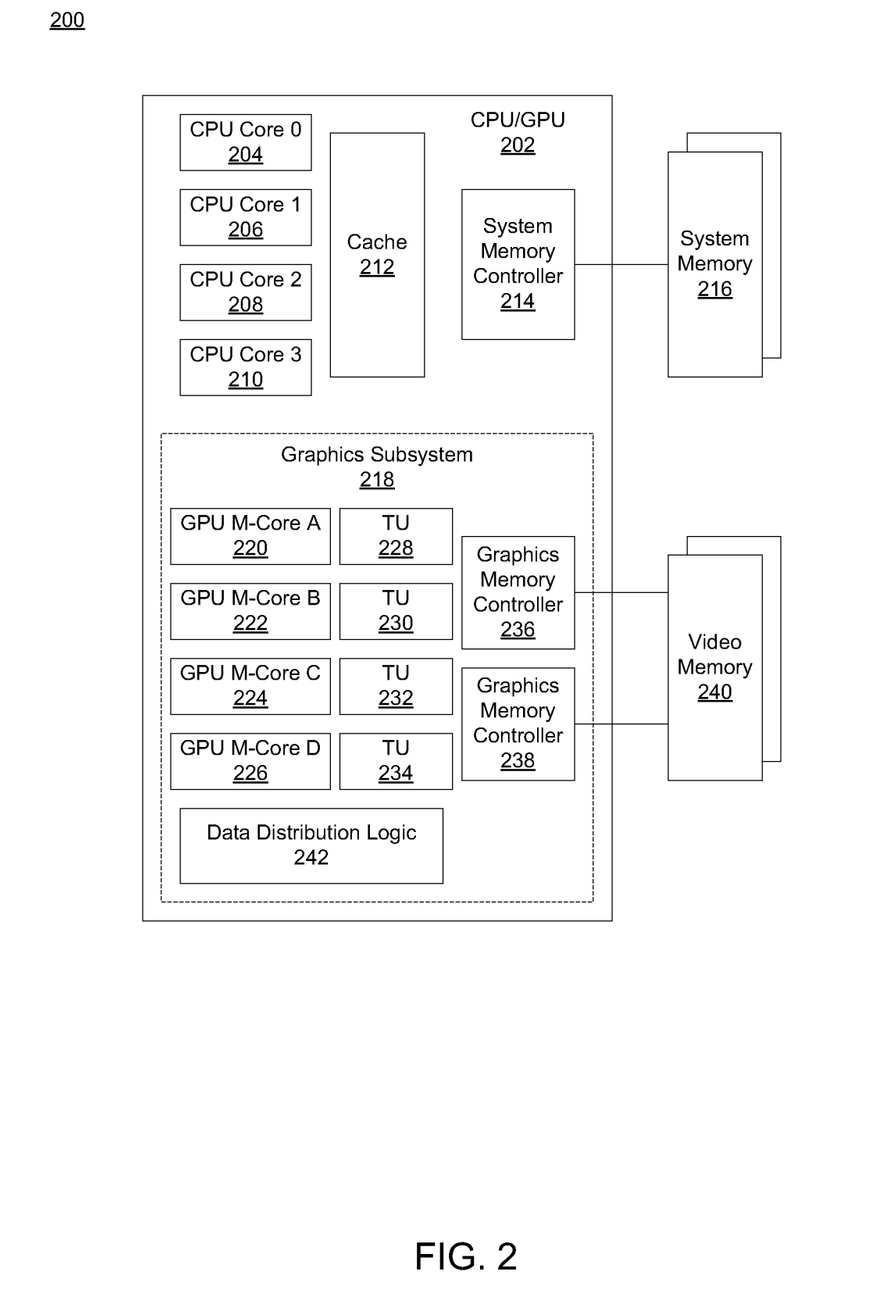
FIG. 2 illustrates another embodiment of a general purpose computer system implementing a bottleneck-sensitive graphics pipeline scheduling architecture.

FIG. 2 illustrates another embodiment of a general purpose computer system implementing a bottleneck-sensitive graphics pipeline scheduling architecture. Computer system 200 is shown. In several embodiments the computer system 200 includes a combination central processing unit/graphics processing unit (CPU/GPU) 202. The CPU/GPU 202 may include more than one CPU core, such as CPU core 0 (204), CPU core 1 (206), core 2 (208), and core 3 (210), which are shown. There may be more or less CPU cores than the four CPU cores shown in FIG. 2. In many embodiments, each CPU core (such as CPU core 0 (104)) includes internal functional blocks such as one or more execution units, retirement units, a set of general purpose and specific registers, etc. If cores such as core 0 (104), core 1 (106), etc. are multi-threaded or hyper-threaded, then each hardware thread is considered as a core for the purposes of this invention.

CPU/GPU 202 may also include a cache 212 to store data. CPU/GPU 202 also may include a system memory controller 214 to provide an interface to communicate with system memory 216. System memory 216 may comprise a form of DRAM, non-volatile memory, PCM, or another type of memory technology. The system memory 216 may be a general purpose memory to store data and instructions to be operated upon by CPU/GPU 202, other CPUs within computer system 200, and potentially other devices within computer system 200, such as a DMA-capable I/O device.

The CPU/GPU 202 may also include an integrated graphics subsystem 218. The graphics subsystem 218 may include one or more GPU m-cores to execute draw commands for two and three dimensional image rendering to a display screen. For example, in the embodiment shown in FIG. 2, the graphics subsystem 218 includes four m-cores, GPU m-core A (220), GPU m-core B (222), GPU m-core C (224), and GPU m-core D (226).

In many embodiments, one or more TUs are matched up with the GPU m-cores, at a 1-to-1 ratio. In FIG. 2, which has four separate GPU m-cores, there are four texture units: TU A (228), TU B (230), TU C (232), and TU D (234). In other embodiments, the GPU m-cores and TUs are not matched up in a 1-to-1 basis, thus it is possible to have embodiments with more GPU m-cores than TUs or more TUs than GPU m-cores.

Graphics subsystem 218 also may include one or more graphics memory controllers, such as graphics memory controller A (236) and graphics memory controller B (238). The graphics memory controllers provide an interface between the m-cores/TUs and the video memory 240. The video memory may be some form of DRAM or other memory technology. Generally, video memory is at least as fast or faster in access times than general system memory due to the large amount of throughput required at extremely fast rates for videos and graphics intensive programs.

In many embodiments, graphics subsystem 218 includes data distribution logic 242. Data distribution logic 242 is capable of providing bottleneck analysis of the graphics pipeline in computer system 100. The graphics pipeline bottleneck analysis will be discussed in detail in FIG. 4-FIG. 7.

Figure 3:
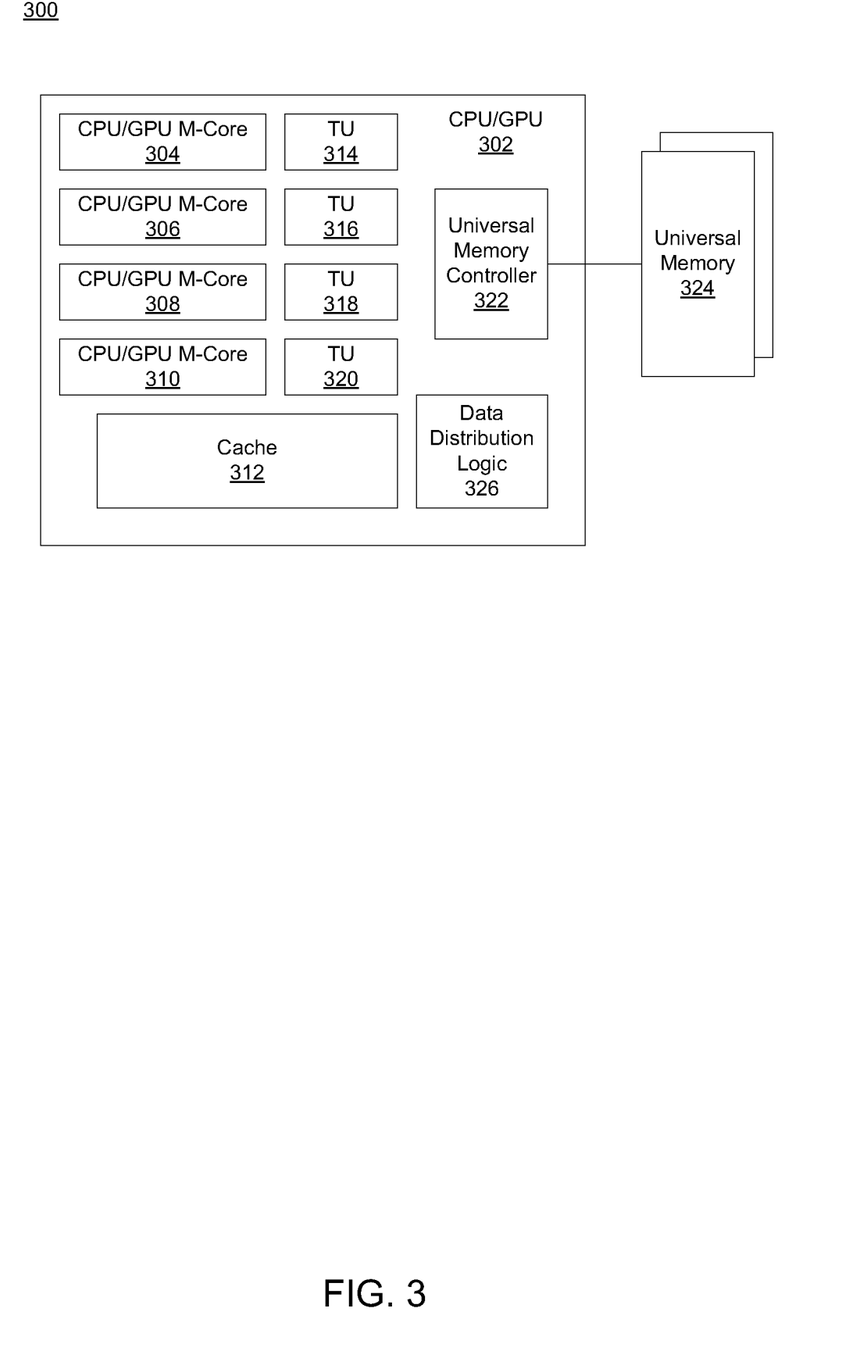
FIG. 3 illustrates yet another embodiment of a general purpose computer system implementing a bottleneck-sensitive graphics pipeline scheduling architecture.

FIG. 3 illustrates yet another embodiment of a general purpose computer system implementing a bottleneck-sensitive graphics pipeline scheduling architecture.

Computer system 300 is shown. In several embodiments the computer system 300 includes a combination central processing unit/graphics processing unit (CPU/GPU) 302. The CPU/GPU 302 may include one or more general purpose cores. In FIG. 3, each general purpose core may perform general CPU tasks and/or specific graphics tasks. These cores, each referred to as a CPU/GPU m-core in FIG. 3, may be assigned a general purpose task or a graphics-specific task at a given time. In FIG. 3 there are four separate CPU/GPU m-cores shown: CPU/GPU m-core 304, CPU/GPU m-core 306, CPU/GPU m-core 308, and CPU/GPU m-core 310. Each CPU portion of the core includes internal functional blocks such as one or more execution units, retirement units, a set of general purpose and specific registers, etc. CPU/GPU 302 may also include a cache 312 to store data.

In many embodiments, one or more TUs are matched up with the CPU/GPU m-cores. In FIG. 3, which has four separate CPU/GPU m-cores, there are four texture units: TU 314, TU 316, TU 318, and TU 320.

CPU/GPU 302 also may include a universal memory controller 322 to provide an interface to communicate with universal memory 324. The universal memory 324 may be a general purpose memory to store data and instructions to be operated upon by CPU/GPU 302, other CPUs within computer system 300, and potentially other devices within computer system 300, such as a DMA-capable I/O device. In the embodiment shown in FIG. 3, the universal memory is utilized for both system memory and video memory.

In many embodiments, a graphics subsystem includes data distribution logic 326. Data distribution logic 326 is capable of providing bottleneck analysis of the graphics pipeline in computer system 100. The graphics pipeline bottleneck analysis will be discussed in detail in FIG. 4-FIG. 7.

Figure 4:
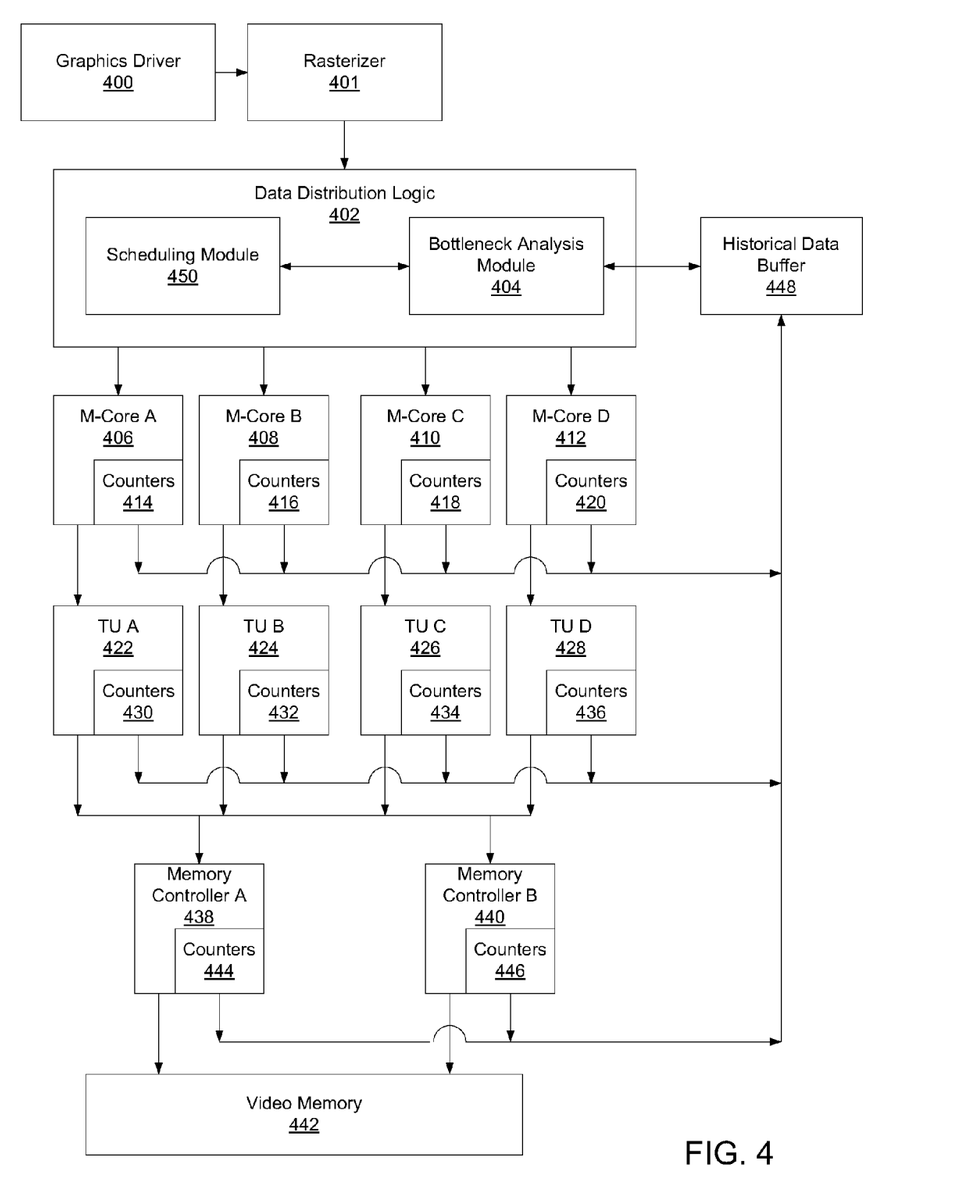
FIG. 4 illustrates an embodiment of detailed view of the graphics subsystem in a computer system implementing a bottleneck-sensitive graphics pipeline scheduling architecture.

FIG. 4 illustrates an embodiment of detailed view of the graphics subsystem in a computer system implementing a bottleneck-sensitive graphics pipeline scheduling architecture.

A graphics driver 400 sends a draw call (i.e. command) to the graphics hardware subsystem. The draw call deals with rendering a combination of data (e.g. pixel, vertex, geometry, etc.) to create an image to store in a frame buffer in a memory. The frame buffer holds the information displayed on a display device, such as a video monitor. The data may be divided into blocks according to their coordinates in an image to be rendered. For example, a 3D image to be rendered may be 640 pixels wide by 480 pixels high. This image may be divided into a grid of blocks that are 8 pixels by 8 pixels each, 16 by 16, 32 by 32, etc. In many embodiments, each block may be processed separately, such as by separate processors, texture units, etc.

Figure 5A:
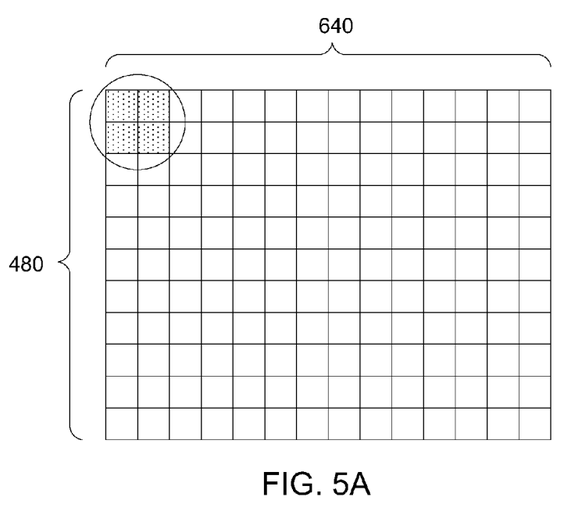
FIGS. 5A-5C illustrate an embodiment of a screen image divided into blocks of different sizes.
Figure 5B:
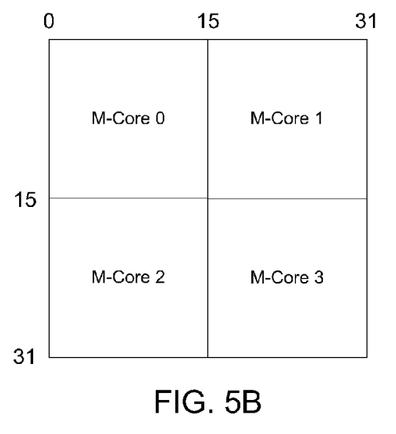
Figure 5C:
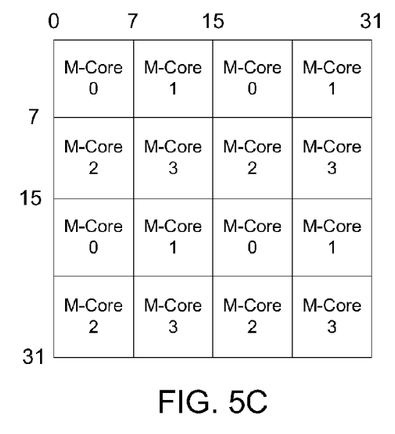

FIGS. 5A-5C illustrate an embodiment of a screen image divided into blocks of different sizes.

FIG. 5A shows a 640×480 image. As shown, the image is divided into many blocks. For example, four blocks in the upper left corner of the entire image size are blown up in FIG. 5B and FIG. 5C to show different potential block sizes. In FIG. 5B, the upper left block of the four spans the pixels from coordinate 0, 0 (upper left corner of the block) to coordinate 15, 15 (lower right corner of the block). The other three blocks fill out the group and, as shown, each block includes a 16×16 grid of pixels. Alternatively, in FIG. 5C, the upper left 2×2 grid of blocks shown in FIG. 5A is further divided into smaller blocks that are 8 pixels by 8 pixels across. As discussed above, each block may be worked on separately by different hardware. For example, as shown in FIGS. 5B and 5C, the blocks are divided amongst four m-cores (m-core 0, m-core 1, m-core 2, and m-core 3).

Returning to FIG. 4, a rasterizer 401 receives the draw call and then generates pixel data related to the draw call and sends the pixel data to the data distribution logic 402. Data distribution logic 402 may utilize several algorithms to determine the limiting performance factor of the draw call.

In many embodiments, data distribution logic 402 includes a bottleneck analysis module 404. The bottleneck analysis module 404 retrieves information from the graphics subsystem to calculate which portion of the subsystem is being taxed the greatest. This information is generally in the form of performance counters that are implemented in many of the devices that operate in the graphics subsystem. For example, in the embodiment shown there are four m-cores (M-core A 406, M-core B 408, M-core C 410, and M-core D 412) that perform work related to the draw call (e.g. perform geometry calculations) and in each m-core there are several performance counters, such as m-core A counters 414, m-core B counters 416, m-core C counters 418, and m-core D counters 420. Along with the m-cores, there are four texture units in the embodiment shown in FIG. 4 (TU A 422, TU B 424, TU C 426, and TU D 428). Each texture unit may include a set of performance counters as well, such as TU A counters 430, TU B counters 432, TU C counters 434, and TU D counters 436. Once the m-cores and texture units operate on the draw call, then the results are sent to video memory 442 through one or more memory controllers that interface with the video memory 442, such as memory controller A 438 and memory controller B 440. Each memory controller present also may include a set of performance counters (e.g. memory controller A counters 444 and memory controller B counters 446). The video memory 442 may store one or more texture caches (i.e. storage areas for texture data), one or more frame buffers, as well as many other types of image-related data.

In many embodiments, all of the performance counters send data to a historical data buffer 448. The historical data buffer may be a buffer set up in any sufficient storage location. In some embodiments, the historical data buffer 448 may be a reserved section of the video memory 442. In other embodiments, the historical data buffer 448 may be a reserved section of system memory. In yet other embodiments, the historical data buffer 448 may be a separate memory storage device specifically for the historical data buffer 448. Or in yet other embodiments, the historical data buffer 448 may be integrated into circuitry elsewhere within the graphics subsystem or the computer system as a whole.

The historical data buffer 448 may serve several purposes. For example, performance counters from one or more of the devices shown in FIG. 4 may continuously be feeding the historical data buffer 448 with updated values. In another example, there may be an interval timer present in the computer system and every time the timer expires at the end of the interval each of the counters in the entire system write out their current values to the historical data buffer. In other embodiments, the information retrieved from the counters are fed to the bottleneck analysis module, which then will perform one or more computations utilizing one or more pieces of counter data and then the bottleneck analysis module 404 may store the computed results in the historical data buffer 448.

In many embodiments, at a given moment in time, the bottleneck analysis module 404 will retrieve all relevant data from performance counters in the m-cores, texture units, and/or memory controllers. The bottleneck analysis module 404 will then compute the utilization of the m-cores and/or the video memory 442 and make a determination as to how the current workload running in the graphics subsystem is affecting the utilization levels of the m-cores as well as the video memory.

For example, one draw call may cause one m-core (e.g. m-core A 406) to be much more heavily utilized than the other three m-cores. This causes an unbalanced workload since not all four m-cores are operating equally and therefore the graphics subsystem is not being efficiently used because of an unbalanced amount of work for the m-cores. In another example, the bottleneck analysis module may find that all four m-cores are being equally utilized but at a fraction of their overall computing power because there is a great deal of texture data being moved around in the video memory 442 for each vertex or pixel. Thus, low amounts of geometry are being computed but the throughput of data is maxed for the available memory bandwidth. Again, this would lead to overall inefficiency of the graphics subsystem because the m-cores are not being required to perform work at a fast rate and they are being starved for data due to memory inefficiencies.

Some draw calls are computing intensive, which means that the m-cores that do all the computing calculations will have a larger amount of work to complete per call. Other draw calls are memory intensive, which means that there may be a large amount of data being transferred to and from memory. Furthermore, yet other draw calls switch between these two categories over the course of the entire length of the call.

For computing intensive draw calls, a balanced workload among all m-cores is important to overall graphics subsystem performance. Conversely, texture cache efficiency is biggest factor for memory intensive draw calls. In a computing intensive draw call, an unbalanced m-core workload may cause performance degradation. In memory intensive draw call, a workload that starves m-cores for work will also lead to performance degradation.

The size of the block that is worked on by an individual m-core/TU will have a different performance impact for the computing intensive draw call than it will for the memory intensive draw call. For example, turning to FIGS. 5B and 5C, a relatively larger block (e.g. FIG. 5B) will benefit a memory intensive workload because of data locality and texture cache efficiency. A relatively smaller block (e.g. FIG. 5C) will benefit a compute intensive workload because for any given area of the image that work is being performed on, more m-cores are working on the data within that given area.

Returning to FIG. 4, once the type of workload has been computed by the bottleneck analysis module 404, the determination as to how to schedule the remaining portion of the current draw call or a next (or other future) draw call that utilizes similar image parameters (i.e. image data that caused the current workload situation), the decision on how large or small of blocks to break up the work into is sent to the scheduling module 450. The scheduling module then processes the data of the draw call and tells each m-core and texture unit which blocks at which coordinates they will be working on. In other words, based on the determination as to the block size by the bottleneck analysis module 404, which is sent to the scheduling module 450, the scheduling module 450 then sends m-core A 406 a command such as perform calculations on data residing in the block starting at 0, 0 and ending at 7, 7, the block starting at 16, 16 and ending at 23, 23, etc. Commands are also sent out to the other m-cores and the texture units. In another embodiment, the block scheduling commands are sent specifically to the m-cores and each m-core then communicates the scheduling commands to the texture unit it is paired with.

Some of the standard performance counters that may be utilized to report data for bottleneck analysis are "Retired Texture Instructions" and "Retired Computing Instructions" which may reveal how many texture instructions and computing instructions, respectively, have been completed. If these are collected over a specific period of time, the rate per sampling interval for each may be determined, which can lead to an instruction throughput calculation that when compared to baseline values may allow an efficiency estimation to be taken for each m-core and texture unit. Additionally, memory controllers may include counters such as "Memory Busy Cycles," "Memory Idle Cycles," "Memory Read Rate," and "Memory Write Rate." The data received from these counters also may be able to allow a general memory efficiency calculation.

For example, with the above counters that are all collected over a given amount of time, a memory utilization percentage may be calculated over that given time frame by the following equation:

$$\text{Memory Utilization \%} = \frac{\text{Memory Busy Cycles}}{(\text{Memory Busy Cycles} + \text{Memory Idle Cycles})}$$

In many embodiments, memory read and memory write operations may achieve different peak usage percentages of memory bandwidth, so different thresholds for reading and writing may be utilized. In one example, when the following equation is true, memory can be determined to be the bottleneck:

Mem Util %>(Memory Read Rate*Read Threshold)+
(Memory Write Rate*Write Threshold)

Thus, if memory utilization is the bottleneck, this may be determined by bottleneck analysis module 404 and a command may then be sent from the bottleneck analysis module 404 to the scheduling module 450 to increase the block size.

In many embodiments, the counter information is taken dynamically during work on a given draw call. Thus, the bottleneck analysis module can determine in real-time whether or not the graphics subsystem is working efficiently on the call. If the analysis of the workload determines that a bottleneck exists (whether it is a m-core bottleneck problem or a memory bottleneck problem, then the bottleneck analysis module may tell the scheduling module to modify the block size and reschedule m-cores and texture units for different sized blocks immediately. Additionally, in many embodiments, each draw call may be of a certain type or include a set of parameters associated with the call. If a draw call of a certain type or with a certain set of similar parameters cause a specific type of bottleneck, this may be noted by the bottleneck analysis module 404 and stored within the historical data buffer 448. In these embodiments, if another similar draw call, with a similar type or with similar parameters can be determined when the call is received by the rasterizer 401, this can be looked up in the historical data buffer and the bottleneck analysis module may decide that such a call has historically performed best with a certain sized block. This information can then be fed to the scheduling module 450 and the scheduling module 450 can schedule the call using the most efficient block size, which was determined in previous iterations of such a call.

Figure 6:
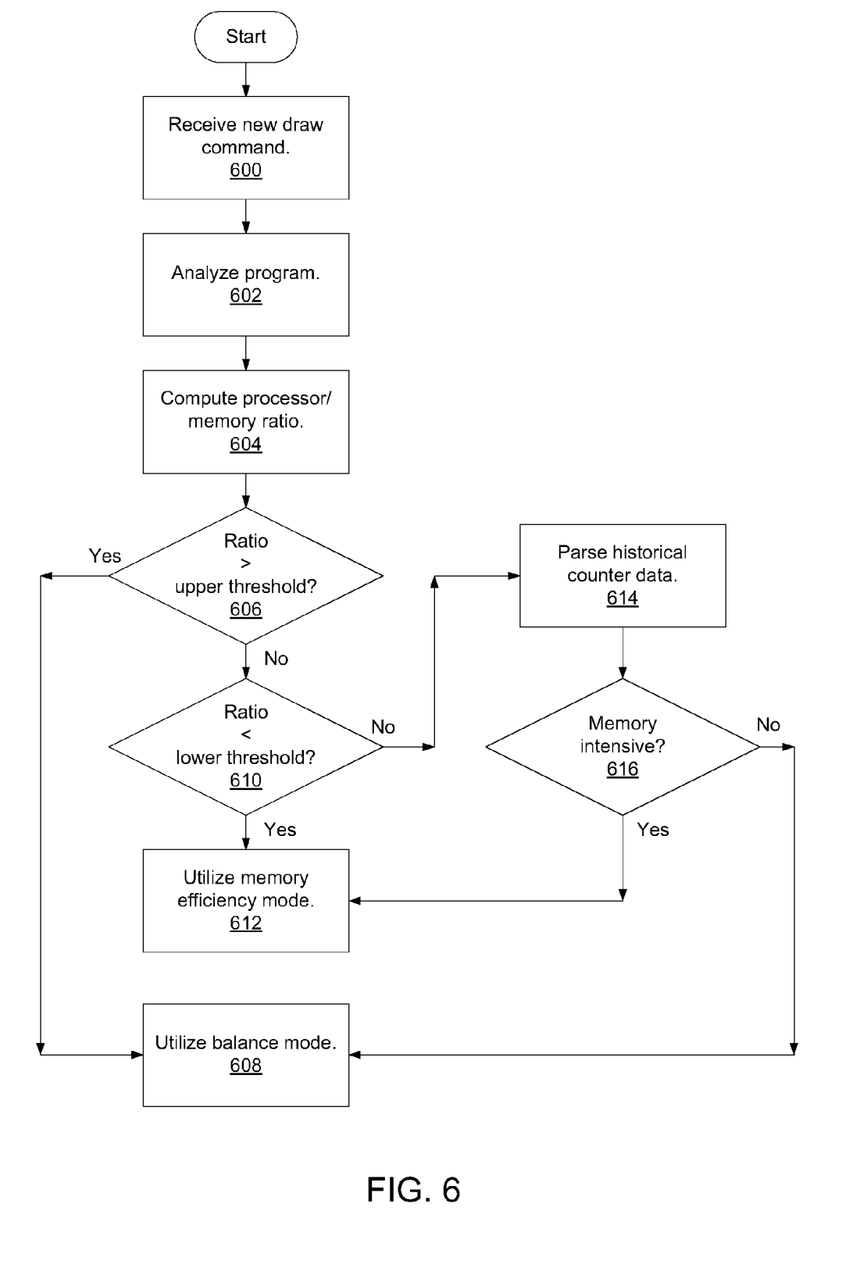
FIG. 6 is a flow diagram of an embodiment of a process to analyze a graphics pipeline bottleneck and schedule a mode appropriate for such a bottleneck.

FIG. 6 is a flow diagram of an embodiment of a process to analyze a graphics pipeline bottleneck and schedule a mode appropriate for such a bottleneck.

The process may be performed by processing logic, which may include hardware (e.g. circuitry), software (e.g. general purpose programs), firmware (e.g. microcode), or any combination of the three types of processing logic. Turning to FIG. 6, the process begins by processing logic receiving a new draw command (i.e. draw call) (processing block 600). Processing logic then analyzes the program that sent the draw command (processing block 602). At the beginning of a draw command, processing logic will analyze the program and historical draw calls performance data, and determine the default mode of this draw. The computing instructions retired over memory instructions retired ratio is an important factor for program analysis.

Processing logic computes the ratio of Computing Instructions Retired/Memory Instructions Retired (processing block 604), which may be shortened to a Computing/Memory Ratio. Thus if the number is greater than 1, then computing instructions are being retired at a faster rate than memory instructions. Alternatively, if the number is less than 1, then memory instructions are being retired at a faster rate than computing instructions. In many embodiments, ratio threshold values are predetermined to compare the ratio against. For example, an upper ratio threshold may be 10, which means that if there are more than 10 times the number of computing instructions being retired than memory instructions, it may be decided that the workload is a computing bottleneck. Conversely, a lower ratio threshold maybe 5, which means that if there are less than 5 times the number of computing instructions being retired than memory instructions, it may be decided that the workload is a memory bottleneck. In other embodiments, other values are utilized for the upper and lower ratio threshold values to determine whether there are bottlenecks in the graphics subsystem.

Thus, processing logic may then determine if the ratio computed is greater than the predetermined upper ratio threshold value (processing block 606). If this is the case, then the workload is a computing bottleneck and processing logic then utilizes a balanced mode (processing block 608), which attempts to cause greater distribution of the workload created by the draw call across the entire set of available m-cores through the use of smaller block size.

Returning to block 606, if the computed ratio is not above the upper ratio threshold, then processing logic may determine if it is below the lower ratio threshold (processing block 610). If the ratio is below the lower ratio threshold, the processing logic utilizes a memory efficiency mode (processing block 612), which attempts to cause greater memory and texture cache efficiency through the use of larger block size.

Returning to block 610, if the ratio is not below the lower ratio threshold, then the workload is not automatically determined to be either a computing bottleneck or a memory bottleneck. If this is the case, then processing logic parses the counter data from the historical data buffer for information to determine what type of workloads the program draw commands have been causing (processing block 614).

Upon looking at the counter data, processing logic then determines if the draw calls are memory intensive (processing block 616). The determination as to whether the draw calls have been memory intensive may utilize different counters in different embodiments. One example would be to utilize a particular ratio of computing instructions retired over memory instructions retired. For example, if the ratio utilized is 8 computer instructions per memory instruction, then if the ratio determined is less than 8:1 (computer instructions over memory instructions), then draw call may be designated as memory intensive. Again, the particular ratio utilized to test against may be 8 or a number higher or lower than 8. In many embodiments, this ratio is predetermined. In an alternative embodiment, if the memory utilization percentage (as computed in the equation further above) is above a certain percentage, that may classify the workload as being memory intensive. Other embodiments may use yet other equations to compute memory intensity.

Once it is determined whether the workload is memory intensive, then processing logic may utilize the memory efficiency mode (processing block 612) if the workload is memory intensive, otherwise processing logic may utilize the balance mode (processing block 608) if the workload is not memory intensive and the process is complete.

Figure 7:
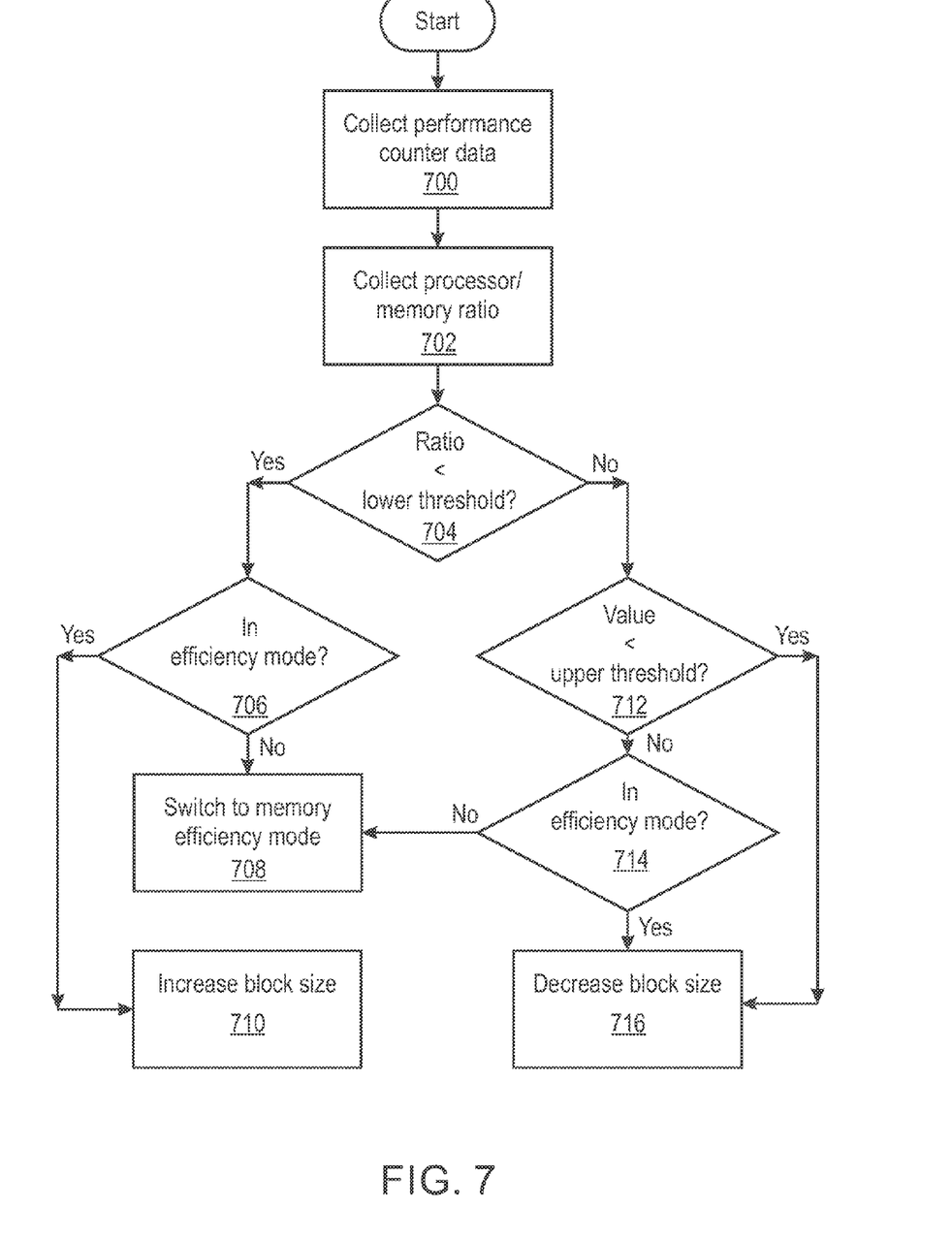
FIG. 7 is a flow diagram of an embodiment of a process to analyze graphics pipeline bottlenecks and switch scheduling modes dynamically.

FIG. 7 is a flow diagram of an embodiment of a process to analyze graphics pipeline bottlenecks and switch scheduling modes dynamically.

The process may be performed by processing logic, which may include hardware (e.g. circuitry), software (e.g. general purpose programs), firmware (e.g. microcode), or any combination of the three types of processing logic. Turning to FIG. 7, the process begins by processing logic collecting performance counter data from one or more performance counters in the graphics subsystem (processing block 700).

Processing logic then computes the computing instructions retired over the memory instructions retired ratio (processing block 702). If the ratio is below the lower ratio threshold then it is determined that memory is the bottleneck. Processing logic will then determine if the graphics subsystem is currently operating in memory efficiency mode (processing block 706). If the graphics subsystem is not operating in memory efficiency mode, then processing logic switches to memory efficiency mode (processing block 708). Otherwise, if the graphics subsystem is operating in memory efficiency mode, then processing logic increases the block size to be operated upon (processing block 710). For example, if the current block size is 16×16, processing logic may increase the block size to be operated upon to 32×32.

Returning to block 704, if the ratio is not lower than the lower ratio threshold, then processing logic determines whether the ratio is above the upper ratio threshold (processing block 712). If the ratio is not above the upper ratio threshold, then no bottleneck has been determined. In this case, this means that there is a computing bottleneck and processing logic checks to see if the graphics subsystem is operating in memory efficiency mode. If the graphics subsystem is not operating in memory efficiency mode (processing block 714) then processing logic switches to memory efficiency mode (processing block 708). Otherwise, when the graphics subsystem is operating in memory efficiency mode, then processing logic decreases the block size to be operated upon (processing block 716). For example, if the current block size is 16×16, processing logic may decrease the blocks size to be operated upon to 8×8.

Thus, embodiments of a method, device, and system implementing a bottleneck-sensitive graphics pipeline scheduling architecture are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:
1. A method, comprising:
determining a current ratio of computing instructions retired divided by memory instructions retired via a central processing unit, graphics processing unit, or any combination thereof;

comparing the current ratio to a lower ratio threshold value; and configuring a next draw command to be performed using a memory efficiency mode in response to the current ratio being below the lower ratio threshold value, wherein the memory efficiency mode is to increase a block size to be operated on.

2. The method of claim 1, further comprising:

comparing the current ratio to an upper ratio threshold value; and configuring the next draw command to be performed using a processor balance operational mode in response to the current ratio being above the upper ratio threshold value.

3. The method of claim 2, further comprising:

collecting one or more performance counter values from one or more of a graphics processor, a texture unit, and a memory controller; and calculating the current ratio from the one or more collected performance counter values.

4. The method of claim 3, further comprising:

performing the actions of collecting and calculating dynamically at predetermined intervals between one or more subsequent draw commands.

5. The method of claim 3, further comprising:

saving the performance counter values in a historical data buffer; and associating the saved performance counter values with the draw command.

6. The method of claim 5, further comprising:

receiving a subsequent draw command, wherein the subsequent draw command includes one or more parameters;

retrieving all historical data buffer information associated with draw commands exhibiting similar parameters to the one or more parameters included with the subsequent draw command; and configuring the subsequent draw command to be performed in an operational mode consistent with the operational mode configured for previous draw commands exhibiting the similar parameters.

7. The method of claim 2, wherein the current ratio comprises a ratio of a graphics multi-core computing utilization value divided by a graphics memory utilization value.

8. The method of claim 2, wherein the memory efficiency mode utilizes blocks of graphics data that are relatively larger in size than blocks of data utilized by a graphics processor efficiency operational mode.

9. The method of claim 8, wherein graphics data comprises one or more of pixel data, vertex data, and geometry data.

10. A device, comprising a central processing unit, graphics processing unit, or any combination thereof to execute logic to control a graphics pipeline, the logic to:

determine a current ratio of computing instructions retired divided by memory instructions retired;

compare the current ratio to a lower ratio threshold value; and configure a next draw command to be performed using a memory efficiency mode in response to the current ratio being below the lower ratio threshold value, wherein the memory efficiency mode is to increase a block size to be operated on.

11. The device of claim 10, wherein the logic is further operable to:

compare the current ratio to an upper ratio threshold value; and configure the next draw command to be performed using a processor balance operational mode in response to the current ratio being above the upper ratio threshold value.

12. The device of claim 11, wherein the logic is further operable to:

collect one or more performance counter values from one or more of a graphics processor, a texture unit, and a memory controller; and calculate the current ratio from the one or more collected performance counter values.

13. The device of claim 12, wherein the logic is further operable to:

perform the actions of collecting and calculating dynamically at predetermined intervals between one or more subsequent draw commands.

14. The device of claim 12, wherein the logic is further operable to:

save the performance counter values in a historical data buffer; and associate the saved performance counter values with the draw command.

15. The device of claim 14, wherein the logic is further operable to:

receive a subsequent draw command, wherein the subsequent draw command includes one or more parameters;

retrieve all historical data buffer information associated with draw commands exhibiting similar parameters to the one or more parameters included with the subsequent draw command; and configure the subsequent draw command to be performed in an operational mode consistent with the operational mode configured for previous draw commands exhibiting the similar parameters.

16. The device of claim 11, wherein the current ratio comprises a ratio of a graphics multi-core computing utilization value divided by a graphics memory utilization value.

17. The device of claim 11, wherein the memory efficiency mode utilizes blocks of graphics data that are relatively larger in size than blocks of data utilized by a graphics processor efficiency operational mode.

18. The device of claim 17, wherein graphics data comprises one or more of pixel data, vertex data, and geometry data.

19. A system, comprising a graphics driver to provide one or more draw commands;

a rasterizer to provide an amount of pixel data in response to the draw call;

one or more graphics processing multi-core, the one or more graphics processing multi-cores each including one or more multi-core performance counters;

one or more texture units, the one or more texture units each including one or more texture performance counters;

one or more memory controllers, the one or more memory controllers each including one or more memory performance counters;

a historical data buffer to store performance counter data from one or more of the multi-core performance counters, the texture performance counters, and the memory performance counters; and a data distribution logic unit to:

determine a current ratio of computing instructions retired divided by memory instructions retired;

compare the current ratio to a lower ratio threshold value and to an upper ratio threshold value;

configure a next draw command received from the graphics driver to be performed using a memory efficiency mode in response to the current ratio being below the lower ratio threshold value, wherein the memory efficiency mode is to increase a block size to be operated on; and configure the next draw command to be performed using a processor balance operational mode in response to the current ratio being above the upper ratio threshold value.

20. The system of claim 19, wherein the data distribution logic unit is further operable to:

calculate the current ratio from the stored performance counter data from at least one of the one or more multi-core performance counters, texture performance counters, and memory performance counters.

21. The system of claim 20, wherein the data distribution logic unit is further operable to:

calculate the current ratio dynamically at predetermined intervals between one or more subsequent draw commands received from the graphics driver.

22. The system of claim 20, wherein the data distribution logic unit is further operable to associate the stored performance counter values with a current draw command.

23. The system of claim 22, wherein the data distribution logic unit is further operable to:

receive a subsequent draw command from the graphics driver, wherein the subsequent draw command includes one or more parameters;

retrieve all historical data buffer information associated with draw commands exhibiting similar parameters to the one or more parameters included with the subsequent draw command; and configure the subsequent draw command to be performed in an operational mode consistent with the operational mode configured for previous draw commands exhibiting the similar parameters.

24. The system of claim 19, wherein the current ratio comprises a ratio of a graphics multi-core computing utilization value divided by a graphics memory utilization value.

25. The system of claim 19, wherein the memory efficiency mode utilizes blocks of graphics data that are relatively larger in size than blocks of data utilized by a graphics processor efficiency operational mode.

* * * * *